(12) United States Patent
Doebbeling et al.

(10) Patent No.: US 9,963,995 B2
(45) Date of Patent: May 8, 2018

(54) METHOD OF OPERATING A TURBINE ENGINE AFTER FLAME OFF

(71) Applicant: ANSALDO ENERGIE IP UK LIMITED, London (GB)

(72) Inventors: Klaus Doebbeling, Windisch (CH); Christopher Michael Robson, Ennetbaden (CH); Massimo Giusti, Wettingen (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 705 days.

(21) Appl. No.: 14/496,856

(22) Filed: Sep. 25, 2014

(65) Prior Publication Data
US 2015/0098792 A1    Apr. 9, 2015

Related U.S. Application Data

(63) Continuation of application No. PCT/EP2013/056199, filed on Mar. 25, 2013.

(30) Foreign Application Priority Data

Mar. 29, 2012 (EP) .................................... 12162028

(51) Int. Cl.
*F01D 21/14* (2006.01)
*F01D 19/00* (2006.01)
(Continued)

(52) U.S. Cl.
CPC ............. *F01D 21/14* (2013.01); *F01D 19/00* (2013.01); *F01D 21/00* (2013.01); *F01D 21/003* (2013.01);
(Continued)

(58) Field of Classification Search
CPC ........ F01D 21/14; F01D 21/00; F01D 21/003; F01D 21/006; F01D 21/02; F01D 19/00; F02C 9/48
See application file for complete search history.

(56) References Cited

U.S. PATENT DOCUMENTS 5,783,932 A * 7/1998 Namba ................... H02J 9/066
290/47
7,621,117 B2 * 11/2009 Dooley ................... F01D 15/10
60/226.1
(Continued)

FOREIGN PATENT DOCUMENTS

CN      1833095 A      9/2006
CN    101240720 A      8/2008
(Continued)

OTHER PUBLICATIONS

Office Action (Notification of Reasons for Refusal) dated Jan. 10, 2017, by the European Patent Office in corresponding Japanese Patent Application No. 2015-502260. (8 pages).

*Primary Examiner* — Craig Kim
(74) *Attorney, Agent, or Firm* — Buchanan Ingersoll & Rooney PC

(57) ABSTRACT

The present invention relates to a method of decelerating a turbine rotor of a turbine engine. At least one electric motor is engaged with the turbine rotor. A braking system, preferably the starting system, is engaged with the at least one electric motor, preferably the generator of the turbine engine, so as to use the at least one electric motor to apply a negative (braking) torque on the turbine rotor. The method includes after flame off, the braking system being used for dissipating kinetic energy available in the turbine engine after flame off by means of the at least one electric motor.

15 Claims, 3 Drawing Sheets

(51) Int. Cl.
  *F01D 21/00* (2006.01)
  *F01D 21/02* (2006.01)
  *F02C 9/48* (2006.01)

(52) U.S. Cl.
  CPC .......... *F01D 21/006* (2013.01); *F01D 21/02* (2013.01); *F02C 9/48* (2013.01); *F05B 2260/85* (2013.01); *F05B 2260/90* (2013.01); *F05B 2270/304* (2013.01)

(56) References Cited

U.S. PATENT DOCUMENTS

| | | | |
|---|---|---|---|
| 2003/0167773 A1 | 9/2003 | Mathias et al. | |
| 2007/0006636 A1 | 1/2007 | King et al. | |
| 2009/0010760 A1 | 1/2009 | Hayasaka et al. | |
| 2010/0275608 A1 | 11/2010 | Snider et al. | |
| 2010/0280733 A1 | 11/2010 | Jordan, Jr. et al. | |
| 2011/0027061 A1* | 2/2011 | Noack ................. | F01D 21/006 415/1 |
| 2011/0146276 A1 | 6/2011 | O'Neil et al. | |

FOREIGN PATENT DOCUMENTS

| | | |
|---|---|---|
| EP | 1 553 275 A2 | 7/2005 |
| EP | 1 873 358 A2 | 1/2008 |
| EP | 2 428 663 A1 | 3/2012 |
| JP | S48-33298 A | 5/1973 |
| JP | S54-108803 U | 7/1979 |
| JP | S56-124918 A | 9/1981 |
| JP | S59-39935 A | 3/1984 |
| JP | H02-12002 U | 1/1990 |
| JP | H04-54227 A | 2/1992 |
| JP | H04-32202 U | 3/1992 |
| JP | H04-72179 A | 3/1992 |
| JP | H06-173613 A | 6/1994 |
| JP | H07-42793 A | 2/1995 |
| JP | H08-218808 A | 8/1996 |
| JP | H08-265991 A | 10/1996 |
| JP | 2000-032796 A | 1/2000 |
| JP | 2006-523834 A | 10/2006 |
| JP | 2008-101489 A | 5/2008 |
| WO | 2006/077642 A1 | 7/2006 |

* cited by examiner

METHOD OF OPERATING A TURBINE ENGINE AFTER FLAME OFF

CROSS-REFERENCE TO RELATED APPLICATIONS

This application claims priority to PCT/EP2013/056199 filed Mar. 25, 2013, which claims priority to European application 12162028.0 filed Mar. 29, 2012, both of which are hereby incorporated in their entireties.

TECHNICAL FIELD

The present invention relates generally to turbine systems or engines, in particular to methods for optimized turbine rotor deceleration after interruption of fuel flow (i.e. after flame off) in particular so as to reduce the overall deceleration time and the mechanical and thermo-mechanical stress on the turbine system or engine.

BACKGROUND

Turbine shut-down procedures are important and regularly performed processes that have to be followed through safely and in a controlled and reliable manner. During the run-down of the engine, the turbine is not working productively; the resultant dead time shall be kept, for technical and economic reasons, on a minimum.

US 2010/0275608 A1 provides for a method for shutting down a gas turbine engine system, the method including the steps of reducing a flow of fuel to a combustor, reversing the operation of a generator so as to apply torque to the rotor, and increasing the deceleration of the rotor so as to limit a flow of air into the gas turbine engine system. For that specific purpose, a starting system, which is generally provided in turbine systems for the run-up of rotary parts to firing speed, is intended to reverse the operation of the generator so as to apply negative torque to the rotor while the fuel flow is reduced during shut-down procedures.

Eventually, however, after gradually decreasing the fuel flow over time, the fuel flow may be interrupted completely (flame off) and, at some point in the shut-down schedule, the generator may be disconnected, from the grid (generator breaker and/or high-voltage breaker may be opened). Thereupon, the engine is spinning freely and slowly decelerates through bearing friction, aerodynamic forces on the turbine blading and rotor as well as through ventilation and electric losses in the generator. Importantly, after flame off (i.e. after interruption of fuel flow), there is still a large amount of kinetic (i.e. rotational) energy (e.g. up to several megawatt-hour in the case of large gas turbines) stored in the turbine engine. Moreover, after flame off, the run-down process of a large industrial gas turbine may last approximately another 30 minutes until a target speed, e.g. the turning gear speed, or a stand-still of the turbine rotor is finally reached. The time required for this last step, i.e. the reduction in kinetic energy of the freely spinning engine after flame off, adds significantly to the overall dead time of the turbine engine.

There are several negative issues or problems associated with the run-down procedure of a turbine engine, a few of which shall be mentioned in the following:

i. The turbine is not available for immediate restart during the run-down process.
ii. During the run-down, airfoils or other parts of the turbine or the generator will pass through their resonance frequencies and will accumulate load cycles with possible damages after a high number of shut downs.
iii. The turbine will cool down through the airflow in the engine during the run-down time. Consequently, with a subsequent (immediate) restart after the rotor has a rotation speed equal to or smaller than the respective firing speed, substantial thermo-mechanical stresses on the turbine engine occur.
iv. During the run-down the casings and vane carriers cool down faster as compared to the turbine rotor (the latter having, in comparison, larger material thickness and hence cools down at a lower rate). This leads to stronger shrinkage of the vane carriers as compared to the rotor and a reduction of clearances between rotating and static parts. In some cases blocking of the rotor due to "negative" clearances (i.e. too small clearances) is observed. Therefore, part clearances have generally to be set larger than desired in view of minimum cold-build clearances so as to accommodate these thermal transients; naturally this goes at the expense of the overall performance of the engine.
v. During black run-down (i.e. no in-feed from the grid is available) the engine consumes auxiliary power typically supplied by batteries (or generally by battery elements). These battery elements have a considerable cost impact on the turbine engine.

SUMMARY

An object of the present invention is thus to provide a method for decelerating rotary parts of a turbine engine within a reduced run-down time of a turbine engine after flame off. It is a further object to lessen the overall loading, in particular the vibrational loading, on the turbine engine that occurs during run-down.

These objects are achieved, and the above mentioned issues reduced, if not resolved, by the present invention, which provides for a method of decelerating a turbine rotor of a turbine engine (or in general of rotary parts of the turbine engine), wherein at least one electric motor is engaged with the turbine rotor (or the rotary parts), wherein a braking system is engaged with the at least one electric motor (i.e. the electric motor is controlled by the braking system) so as to use the at least one electric motor to apply a negative torque on the turbine rotor (or the rotary part), the method being characterized in that, after flame off, the braking system is used for dissipating kinetic energy available in the turbine engine after flame off by means of the at least one electric motor.

In the following, if disclosure in the context of rotary parts relates to the turbine rotor, it is meant that any rotary part (e.g. also the rotor of the steam turbine) may be subject to said disclosure either alternatively as an individual part or in connection with the turbine rotor. Preferably, the electric motor is an electric generator, the electric generator being preferably provided for supplying a high-voltage network with power during normal operation of the turbine engine, wherein the braking system is used for transforming the kinetic energy into electric energy by means of the electric generator. The multi-functional design allows for production cost reduction and a more compact turbine engine.

Preferably, the braking system is provided by a starting system, the latter being intended for run-up of the turbine rotor to firing speed, as known from state-of-the-art technology. In this text, if disclosure relates to the starting system, it may, wherever appropriate, also relate in a more general manner to the braking system.

Thus, preferably, the electric generator, which is provided for supplying a high-voltage network with power, is engaged with the turbine rotor, wherein a starting system is engaged with the electric generator so as to use the electric generator as a generator (and so as to apply a negative torque on the rotor) or as a starting device (so as to apply a positive torque on the turbine rotor), wherein, in the shut-down schedule after flame off, the starting system may be used for dissipating kinetic energy available in the turbine engine by means of the electric generator, wherein the starting system is used for transforming kinetic energy, which is available in the turbine engine after flame off, into electric (braking) energy by means of the electric generator.

Generally, the method according to the invention, in particular in the case of the operation of gas turbines, is to use the starting system for shaft train deceleration, preferably whenever the generator is not connected to the grid, i.e. the generator breaker is open. A typical turbine engine, for which the use of the static starting device (i.e. the starting system) for deceleration of the shaft train (or the turbine rotor) during shut-down may be advantageously used, is a large industrial gas turbine that has a power rating of e.g. about 50 to about 300 megawatt. It is, however, anticipated that any similar turbine engine and its operation may benefit, in a general manner, from the operation according to the present invention.

Where it is referred to the kinetic energy of the turbine engine it is meant the kinetic energy of all rotary parts, e.g. of the rotating shaft train of the turbine (i.e. the turbine rotor, or several turbine rotors in case of multi-shaft turbines) including the kinetic energy of the rotor of the respective generator and/or of the steam turbine rotor, if any.

The starting system, or the static starting device, that may be used as the braking system, is customarily utilized, on the one hand, for acceleration of a turbine rotor up to firing speed by reversing the operation of the generator in a generally known manner; the operation-reversed generator functions accordingly as a motor that drives the turbine rotor; it applies a motoring torque on the rotor, whereupon the rotor picks up speed. In other words, the generator in reversed mode applies a positive torque on the rotor, i.e. a torque that accelerates the rotor to pick up rotation speed in the preferred direction that is specific for turbines.

On the other hand, the starting system may be used for generative braking by applying a negative torque or a braking torque on the rotor by means of the generator; this braking torque generally increases the deceleration rate of the turbine rotor. Generative braking shall, however, be active preferably only if a deceleration of the turbine rotor speed is desired. Generative braking is thus preferably blocked, for example, during run-up in order to avoid e.g. large power fluctuations caused on the auxiliary bus bars (see below).

During generative braking, the starting system may apply a predefined negative torque or force on the turbine rotor by means of the electric generator, wherein the negative torque is preferably applied in dependence of a rotation speed of the turbine rotor, i.e. it varies in the deceleration process according to a predefined pattern that is specific to the particular turbine engine and the starting system.

The negative torque leads naturally to a deceleration of the freely spinning turbine rotor as there is no compensation for the loss in kinetic energy. The negative (braking) torque may e.g. be up to 70% to 90% of the positive (motoring) torque. It is advantageous to use the built-in generator of the turbine engine, it may, however, also be that an additional electric motor may be provided for the purpose of braking, i.e. for decelerating the rotor movement.

Preferably, the braking system and/or the starting system or static starting device is operated in a four-quadrant operation, wherein two quadrants (one motoring and one braking quadrant) are used, as negative rotation of the shaft after the machine was at zero speed in turbines shall generally be avoided. A motoring quadrant is to be understood as a quadrant in the torque versus rotation speed plot in which the rotation speed is increased; in the braking quadrant the rotation speed is lowered.

As mentioned above, a freely spinning turbine rotor decelerates at a rather low rate due to a plurality of effects, yet with the additional braking power applied by the starting (or braking) system (e.g. a starting system with about 1 to 10 megawatt braking power for a large gas turbine, applied via the electric generator) the deceleration rate of the turbine shaft rotation is strongly enhanced, which in effect reduces the deceleration time from rotation speed at flame off to stand-still by a significant factor. This factor may be of the order of about 3 in the case of a typical industrial gas turbine like the GT13E2 by Alstom (from about 30 minutes deceleration time without generative braking to about 10 minutes with generative braking, see below).

Preferably, the starting system is a system that is already commonly used (or already built-in existing devices). It is known to use a static starting device for the run-up of the rotary parts to ignition or firing speed, whereupon the starting device may be decoupled, or alternatively, may be used for supplying the medium-voltage network with auxiliary power from the power generated by the electric generator during normal operation of the turbine engine.

The medium-voltage grid may thus be meeting the demand for electric power for the auxiliary service of auxiliary devices of the turbine engine, e.g. lube oil pumps, enclosure ventilation, or the like.

In order to further optimized the deceleration of rotary parts of the turbine engine, such as the turbine rotor of turbine and steam turbine, if any, the negative torque applied on the turbine rotor is varied during the deceleration of the turbine rotor in dependence of at least one key parameter selected from the group consisting of a rotation speed of the turbine rotor, a vibrational loading on elements or groups of elements connected to or comprised by the turbine engine, a condition of the braking system (in particular its temperature), a condition of the electric motor, a condition of the network connected to the generator (e.g. the high- or medium-voltage grid) or other key parameters that may be defined by the skilled person in the field to which the invention pertains.

Of course, it is also possible to use two or more key parameters in order to vary the braking torque applied on the rotary parts by the braking system. An example would be, that the braking system may work under peak loading (i.e. applying the maximum negative torque) while the vibrational loading is high (e.g. during occurrence of vibration resonances of elements or groups of elements connected to or comprised by the turbine engine), yet if the braking system is at risk to take serious overheat damage due to peak-loading operation, the negative torque shall be reduced despite strong vibrations. So, in this case the first key parameter may be the vibration loading and the second the actual condition (say the temperature) of the braking system. As the vibration loading may be directly connected the rotation speed of the rotary parts, an alternative first key parameter would be said rotation speed (see below for further explanations). A skilled person in the art knows to plan and to commission solutions with various key parameters depending on the specific turbine engine design.

It is a commonly known problem, that, during run-up and/or run-down, turbine engines suffer from increased vibrational loading while the rotation speed of rotary parts runs through vibration resonances or resonance bands of single elements (e.g. the turbine rotor) or groups of elements connected to or comprised by the turbine engine. In the following the term "resonance" may be read as torsional and bending vibrations of the respective elements or groups of elements. This phenomenon is in some cases e.g. audible for the operator as the whole engine starts to vibrate for some time while the rotation speed changes. The resonances or resonance bands of elements and groups of elements (or the corresponding distribution of vibrational amplitude versus rotation speed) may be known to the operator from experience and/or may be calculated with finite element software and are graphically visualized as Campbell diagrams. These resonances occur naturally in the total rotation speed range (i.e. the rotation speed range from rotation speed at flame off down to zero speed) as a function of rotation speed of the rotor; a vibration resonance or resonance band is to be understood here as a resonance that occurs over a limited speed range (the resonance speed range). There may well be several distinct resonance speed ranges in the total speed range of a turbine engine e.g. due to several resonances that occur in the total speed range. The vibration resonances may occur in relation to a single element of the turbine engine 1 (e.g. the turbine rotor or stator, the bearings, . . . ) or connected to the turbine engine (e.g. the turbine housing, the control unit, . . . ) or they may occur in relation to groups of such elements. For such an element or for such a group of elements several different vibration resonances may occur in the total speed range. The overall resonance spectrum depends on the turbine engine and parts connected thereto.

The rotation speed of the turbine rotor may be used as said key parameter. At least one critical rotation-speed range may be provided within a total rotation speed range of the turbine rotor after flame off, in which at least one critical rotation-speed range (increased) vibrational loads occur preferably due to excitation of resonance frequencies of the elements or groups of elements connected to or comprised by the turbine engine. The braking system may be used so as to increase the negative torque applied to the turbine rotor (i.e. to increase the deceleration rate) from a first level to a second level if the rotation speed of the turbine rotor lies within the critical rotation-speed range (and the braking system is in condition to increase performance). If operated on the first level (of loading), the braking system may work below its peak loading. If operated on the second level (of loading) that is higher than the first level (of loading), the braking system may work on a higher loading as compared to first-level operation. The loading of the braking system on the second level of loading may preferably be peak loading of the braking system.

Preferably, the critical rotation-speed range, set between an upper and a lower critical rotation-speed limit, lies within or overlaps one of the resonance speed ranges. In the critical rotation-speed range undesirable vibrational loads occur due to excitation of eigen or resonance frequencies of elements or groups of elements of the turbine engine.

It is possible to have two or more critical rotation-speed ranges are provided in the total rotation speed range of the turbine rotor and/or wherein, at least temporarily during deceleration of the turbine rotor through the critical rotation-speed range, the negative torque is applied to the turbine rotor so that the braking system is operating in peak-loading operation, whereupon, after said peak-loading operation and preferably during deceleration through a rotation speed range that is not a critical rotation-speed range, the braking system is used with a loading below its peak loading (so as to relax or recover). If there are several critical rotation-speed ranges provide in the total speed range a selection of them may at least partly overlap one another or they may be separated from one another.

The vibrational amplitude versus rotation speed, i.e. the resonance band (or short the resonance), may be approximated by a Gaussian distribution. Then, the upper critical rotation-speed limit may be set at a rotation speed at which the vibrational amplitude is e.g. about 5% to 20%, preferably about 10% of the maximum vibrational amplitude, wherein the maximum vibrational amplitude occurs at a rotation speed that is lower than the upper critical rotation-speed limit. The lower critical rotation-speed limit may be set at a rotation speed at which the vibrational amplitude is e.g. about 5% to 20%, preferably about 10% of the maximum vibrational amplitude, wherein the maximum vibrational amplitude occurs at a rotation speed that is higher than the lower critical rotation-speed limit.

It is preferable to have the braking system working at peak loading as long as possible and preferably within the whole resonance speed range as the deceleration rate would then be maximized. A braking system may, however, be designed such that peak-loading operation may only be possible temporarily during the deceleration process. This generally allows for a cheaper and smaller design of the breaking system. Hence, peak-loading operation of the braking system may not suited for permanent operation (risk of overload of the starting system) and does make necessary a cool down period where loading has to be significantly reduced. In other words, the braking system or the starting system acting as the braking system may run with peak loading for a limited amount of time during the deceleration time and then has to recover for a shorter time than the overall deceleration time after flame off, depending on actual heat transfer away from the overheated device and other parameters. In some cases this part-time peak-loading operation may be necessary as an already built-in starting system with limited capability may be used for active braking.

It is possible to set a plurality of non-overlapping critical rotation-speed ranges within each resonance speed range. Inbetween these non-overlapping critical rotation-speed ranges the starting system may relax so as to not suffer from possible overload damage. If the resonance speed range is narrow enough, the whole range may be covered by peak loading operation. This would be beneficial, as then the starting system may relax while the engine spins in non-critical speed ranges.

A person skilled in the art knows to identify the resonance speed ranges of a specific turbine engine, and also knows to set the critical rotation-speed ranges within these resonance speed ranges depending on the performance of the chosen starting system and the actual turbine engine.

Ideally, the starting system works at peak loading during the entire run-down (minimum vibrations, minimum run-down time). Where this is, for technical or economical or other reasons, not possible, the starting system may work at peak loading during a part of the run-down time, preferably in the resonance speed ranges so as to use the maximum performance of the starting systems while minimizing efficiently the vibrational loading on the engine. It is not necessary that all the resonance speed ranges are provided with critical rotation-speed ranges, it is, however, beneficial to have maximum deceleration in the resonance speed ranges in order to lower the overall vibrational loading on the turbine engine while shortening the run-down time by active generative braking by means of the starting system.

The starting system is thus used, during the deceleration of the turbine rotor, so that, when the rotation speed of the turbine rotor is smaller than or equal to the upper critical rotation speed limit, the negative torque applied to the turbine rotor is increased, preferably until the starting system reaches peak loading, thereby increasing a deceleration rate in the critical rotation-speed range, i.e. in the resonance speed range. Hereupon, when the rotation speed of the turbine rotor is reduced, preferably to be equal to or smaller than the lower critical rotation-speed limit of the critical rotation-speed range it is passing through, the negative torque is decreased again (in order to allow the starting system to relax). By means of this procedure, the overall loading by vibration on the turbine engine is reduced.

The extend of the critical rotation-speed range and its position in the total speed range depend on the actual turbine engine design and use. From model calculations and/or experience values, the typical resonance speed range of common turbine engines are known to and the critical speed ranges to be set by a person skilled in the art.

It is preferred, that two or more non-overlapping critical rotation-speed ranges are provided in the total rotation speed range of the turbine rotor and/or wherein, at least temporarily during deceleration of the turbine rotor through a critical rotation-speed range, the starting system is used in peak-loading operation, whereupon, after said peak-loading operation and preferably during deceleration through a rotation speed range that is not a critical rotation-speed range, the starting system is used with a loading below its peak loading in order to prevent a damaging overload of the starting system.

Depending on the actual turbine engine, it may be enough kinetic energy available in the rotary parts so that the electric (braking) energy generated by the electric generator may be fed into the high-voltage network while a generator output meets requirements of a high-voltage network in-feed (e.g. while the rotation speed of the turbine rotor is higher than a first rotation speed, typically a rotation speed above 2000 rpm).

If the generator output does not meet the high-voltage network requirements (e.g. once the turbine rotor rotation speed falls below this first rotation speed) the high-voltage breaker may be opened so as to disconnect the generator from the high-voltage grid. At this point in the shutdown schedule, there is still kinetic energy stored in the turbine energy (in rotating parts such as the turbine rotor, the generator rotor, the steam turbine rotor, or other parts, depending on the engine construction), thus the generator output due to the active braking may be used further for other purposes.

The electric braking energy may, in general, be fed into a medium-voltage network if the generator output meets requirements of a medium-voltage network in-feed (e.g. at least until the rotor reaches a second rotation speed, the second rotation speed being lower than the first rotation speed, typically above 1500 rpm).

Some of the power produced during generative braking may be fed into the medium-voltage grid while the generative braking power is also supplied to the high-voltage grid or after the generator output does not meet the requirements of the high-voltage network in-feed, e.g. once the rotation speed of the turbine rotor is equal to or lower than said first rotation speed.

Generally, it is an advantageous aspect of the present invention that the kinetic energy stored in the turbine engine after flame off may be at least partly recovered, which improves the overall performance of the engine and has various ecological and machine design-related benefits.

During black run-down (i.e. no in-feed from the grid is available) the engine consumes auxiliary power supplied by batteries. These batteries have a considerable cost impact on the power plant. The power demand of auxiliary power consumers of the turbine engine selected from the group consisting of lube oil pumps, enclosure ventilation, cooling water pumps, due point heaters, trace heaters, and the like, has to be covered.

The electric braking energy may be fed, preferably via the medium-voltage network, into an external load bank (or several thereof), into a battery element, and/or into at least one auxiliary power consumer of the turbine engine, so as to dissipate at least part of the electric braking energy, wherein the electric braking energy is preferably dissipated by recharging the battery elements and/or by at least partly covering an auxiliary power demand by the at least one auxiliary power consumer, respectively.

Battery elements are typically lead acid cells connected in series. Load banks are typically electrical resistors that dissipate electrical power into heat.

The static starting device or the starting system may be used, during black safe coast down, to at least partially supply the auxiliary power consumption (lube oil pumps, enclosure ventilation, or the like). This allows for downsizing of the emergency power supply or battery system.

The electric braking energy may be fed into the external load bank, into the battery element, or into the at least one auxiliary power consumer while the generator output meets the requirements for the medium-voltage grid.

Eventually, e.g. when the rotation speed falls below said second rotation speed during the deceleration according to invention, the generator output may sink below a system specific value, which necessitates the disconnection of the generator from the medium-voltage network also. From this point in the run-down schedule on, a load bank may dissipate the further generator output during deceleration of the rotor down to stand-still. A person skilled in the art knows to determine the relevant turbine engine specific threshold values.

The method according to invention is suited for single shaft turbine engines, wherein the kinetic energy available in the turbine engine from the turbine rotor and/or of the generator rotor of a gas turbine and of a corresponding steam turbine, if any, is dissipated.

The method is also suited for double shaft turbine engines, wherein the kinetic energy available in the turbine engine from both turbine rotors and of a corresponding steam turbine, if any, is dissipated according to invention.

The method is particularly suited if, after a fail start of the turbine engine, the turbine rotor has to be decelerated down to an ignition speed and the turbine engine to be restarted thereafter and as soon as possible.

Using the method according invention for shut-down of an industrial gas turbine engine or another turbine engine or for decelerating or braking a turbine rotor down to firing speed, e.g. for a restart, is advantageous as many of the previously mentioned issues and/or problems may be solved or mitigated. More specifically the method according to invention allows at least:

i. The turbine engine to be run-down quicker as the kinetic energy stored in the freely spinning rotor(s) may be dissipated actively and faster. It is estimated that in a typical industrial gas turbine (e.g. a GT13E2 turbine by Alstom with a power rating of about 150 to 170 megawatt) about 0.5 megawatt-hour of kinetic energy are available. The corresponding turbine rotor may need approximately 30 minutes to decelerate down to stand-still. If the rotor is, however, actively and according to the present invention decelerated by the starting system with e.g. a power rating of about 4 megawatt, about 90% of which may typically be available for braking purposes, the rotor is decelerated in only a third of the time, i.e. in about 10 minutes. Therefore, the shutdown procedure is faster and the turbine engine sooner available for (hot) restart. The availability of the turbine is increased through the shorter time from flame off to being ready for next start up (usually a release criterion based on engine speed exists). This is especially important for frequently starting engines, so-called peakers, and in general for any intermediate load operation market. The present invention improves efficiency in general and therefore is beneficial for an economic and an ecological point of view.

ii. The time periods during which the engine runs through resonance bands of blading or other parts, i.e. through eigen or resonance frequencies of elements or groups of elements of the turbine engine, such as airfoils or other parts of the turbine or the generator, is reduced and hence the numbers of load cycles on these parts during run-down are reduced. Thereby possible damages after a plurality of shut downs are avoided or reduced, which again is economically and also technologically advantageous.

iii. The cool down of the structural engine parts can be reduced by the present invention such that a heat loss during run-down is lower and the engine remains warm for a longer time after shut down—this results in lower thermo-mechanical stresses during restart and in more reliable (hot) restart procedures.

iv. Different shrinkage of the individual parts of the turbine engine and possible blocking problems between static and non-static parts as outlined above may be reduced by the present invention as less thermal transients have to be accommodated. Hence, the overall performance of the engine is improved. Furthermore, the method according to invention allows for reduced rubbing in the vane carriers during run-down, from which reduced reconditioning costs and reduced risk of rotor blocking result.

Moreover, feeding in of power into the grid (or the high-voltage network), into the medium-voltage network, into the load bank, into the battery element, and/or into auxiliary power consumers during deceleration after flame off further improves the overall performance of the engine.

By the present invention, the turbine engine can be brought back faster to restart conditions after a fail start. Start-up reliability is improved.

Generally, existing turbine engines may be upgraded with the generative braking option, in particular turbine engines that already rely on a static starting system that can be programmed or controlled by the GT control system.

4 quadrant operation of the starting system is a standard design feature in typical systems used for large gas turbines. Product cost is expected not to increase significantly; the adaptation in the control system is obvious to a person skilled in the art (GT controls engineer).

Further embodiments of the invention are laid down in the dependent claims.

BRIEF DESCRIPTION OF THE DRAWINGS

Preferred embodiments of the invention are described in the following in more detail with reference to the drawing, which is for the purpose of illustrating the present preferred embodiments of the invention and not for the purpose of limiting the same. In the drawings.

DETAILED DESCRIPTION

Exemplarily, the following explanations rely on a large gas turbine engine 1. It should be apparent, however, that also other analogue turbine systems having different configurations or uses may benefit from the method according to invention. It is to be understood that numerous changes and modifications may be made herein by one of ordinary skill in the art without departing from the general spirit and scope of the invention as defined herein.

Figure 1:
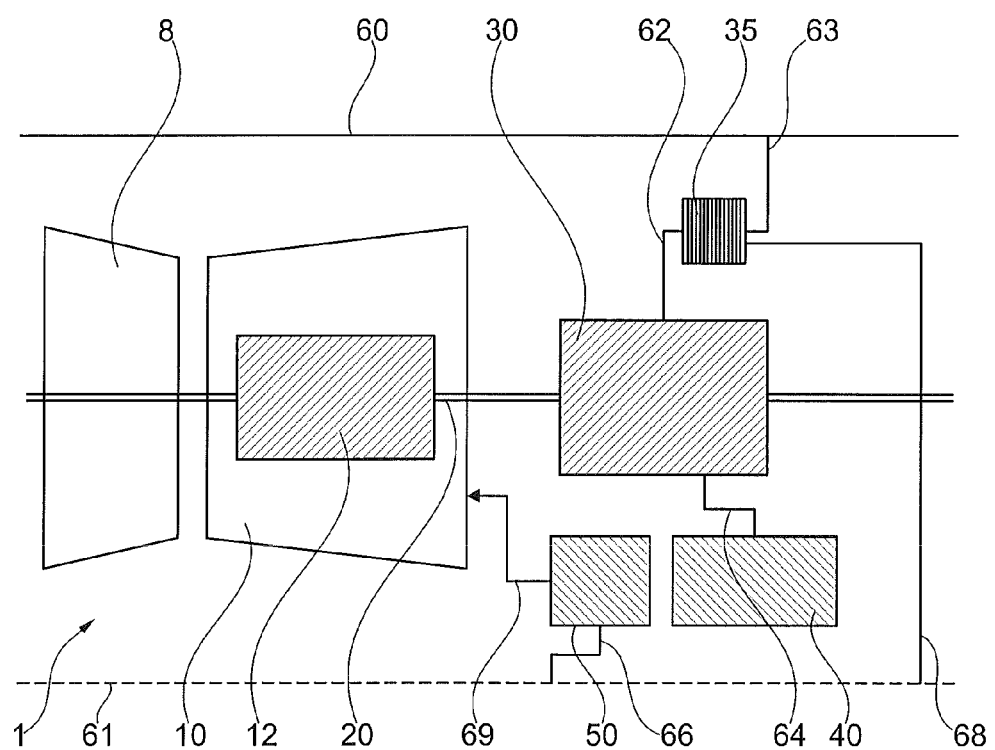
FIG. 1 shows a schematic view of a turbine engine as may be described herein.

A typical state-of-the-art turbine engine 1 as depicted in FIG. 1 may include at least one compressor 8 for compressing an incoming airflow. The compressed air may be delivered to at least one combustor (not shown in the drawings), wherein said air is mixed with fuel, whereupon, after ignition, a flow of combustion gas is guided under expansion through a turbine 10 so as to produce mechanical work via a turbine rotor 12 that is rotatable about a rotation axis 20. The rotor 12 drives the compressor 8 and an electric generator 30 that may rotate about the axis 20 on the same shaft. An output of the electric generator 30 may be delivered via wiring 62 to transformer means 35 and further via wiring 63, 68 to a high-voltage grid 60 and/or a medium-voltage grid 61. In the further process, the combustion gas may be delivered to a steam generator (not shown in the drawings) for recovering of heat.

According to invention, a braking system may be provided by a starting system 40 for the purpose of active (generative) braking of the rotating turbine rotor 12 after flame off; the starting system 40 is thus intended to operate the run-up to firing speed and the run-down after flame off of the turbine rotor 12 to a final or zero speed. The starting system 40 may therefore, for control purposes, be in communication with the electric generator 30 by means of via wiring 64.

In order for the starting system 40 to meet the requirements as a braking system, it may include a load commutating inverter for operating the generator 30 so as to apply a positive (motoring) torque for the running-up (to firing speed) and a negative (braking) torque for the running-down (after flame off) of the turbine rotor 12.

Figure 2:
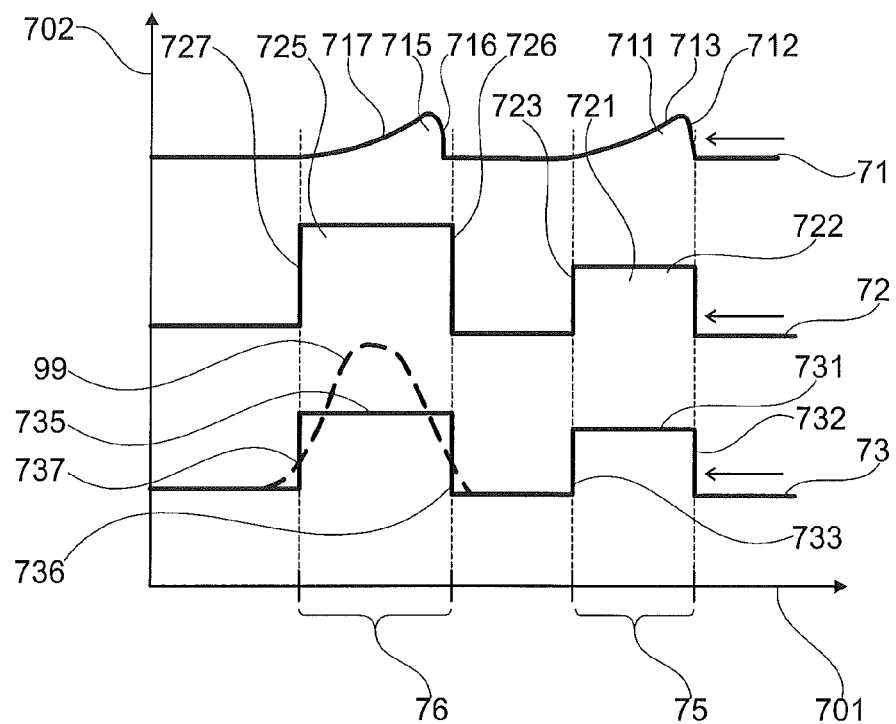
FIG. 2 shows a first schematic illustration of the negative torque applied to the rotary parts of the turbine engine or a loading of the braking system in dependence of the rotation speed of the rotary parts as a key parameter, wherein critical rotation-speed ranges do not overlap.

FIG. 2 shows three exemplary, schematic operation schedules 71, 72, 73 for the starting system 40. It is clear that numerous changes and adaptations may be added to these schedules for a specific turbine engine.

Here, the key parameter may be the rotation speed of the turbine rotor 12. Said rotation speed is plotted on an abscissa 701 in FIG. 2. Further, a first and a second critical rotation speed range 75, 76 are provided on abscissa 701 in a non-overlapping manner. On an ordinate 702 it is plotted the braking torque applied to the turbine rotor 12. Alternatively, the same FIG. 2 may be read with the ordinate providing the braking power delivered by the starting system 40 or the loading that bears on the starting system 40.

The first operation schedule 71 shows two ordinate-value elevations 711, 715 in the respective two critical speed ranges 75, 76. Starting from an arrow near the right end of curve 71, to the left direction, the ordinate first value elevation 711 has an increasing edge 712 and a decreasing edge 713 and the second ordinate-value elevation 715 has an increasing edge 716 and a decreasing edge 717.

The second operation schedule curve 72 shows two ordinate-value elevations 721, 725 in the respective two critical speed ranges 75, 76. Starting from an arrow near the right end of curve 72, to the left direction, the ordinate first value elevation 721 has an increasing edge 722 and a decreasing edge 723 and the second ordinate-value elevation 725 has an increasing edge 716 and a decreasing edge 727. From curve 72 it is clear that the different two ordinate-value elevations 721, 725 may have different heights, i.e. the average ordinate value may be different in the tow speed ranges 75, 76. Moreover, in FIGS. 2 and 3, the ordinate-value elevations may have rounded edges, i.e. they do not have to be rectangular.

The third operation schedule 73 shows two ordinate-value elevations 731, 735 in the respective two critical speed ranges 75, 76. Starting from an arrow near the right end of curve 73, to the left direction, the ordinate first value elevation 731 has an increasing edge 732 and a decreasing edge 733 and the second ordinate-value elevation 735 has an increasing edge 736 and a decreasing edge 737.

In FIG. 2 the increasing edges 712, 716, 722, 726, 732, 736 are steeper than the decreasing edges 713, 717, 723, 727, 733, 737; it may well be vice versa.

Generally, close to the maximum of the ordinate-value elevations 711, 715, 721, 725, 731, 735, the starting system 40 may operate under peak loading (maximum deceleration rate of the turbine rotor 12), while away from the ordinate-value elevations 711, 715, 721, 725, 731, 735 the starting system 40 may operate at a loading that allows the starting system 40 to recover from peak-loading operation. Inbetween the ordinate-value elevations 711, 715, 721, 725, 731, 735 the ordinate values may also vary according to a predefined pattern chosen by one skilled in the art. A person skilled in the art to which the invention pertains knows to set the ordinate-value elevations 711, 715, 721, 725, 731, 735 at specific positions (e.g. to cover speed regions with high vibrational loads on mechanical parts) and with desired shapes.

In FIG. 2 there is also depicted an exemplary resonance 99 curve as discussed above. This resonance curve 99 shows a vibration amplitude of parts of or connected to the turbine engine 1 in dependence of the rotation speed of the turbine rotor 12. The critical rotation-speed range 76 is set here to cover the resonance curve 99, wherein the edges 736, 736 of the corresponding ordinate-value elevation 735 intersect the resonance curve 99 at an amplitude of about 20% of its maximum amplitude.

Figure 3:
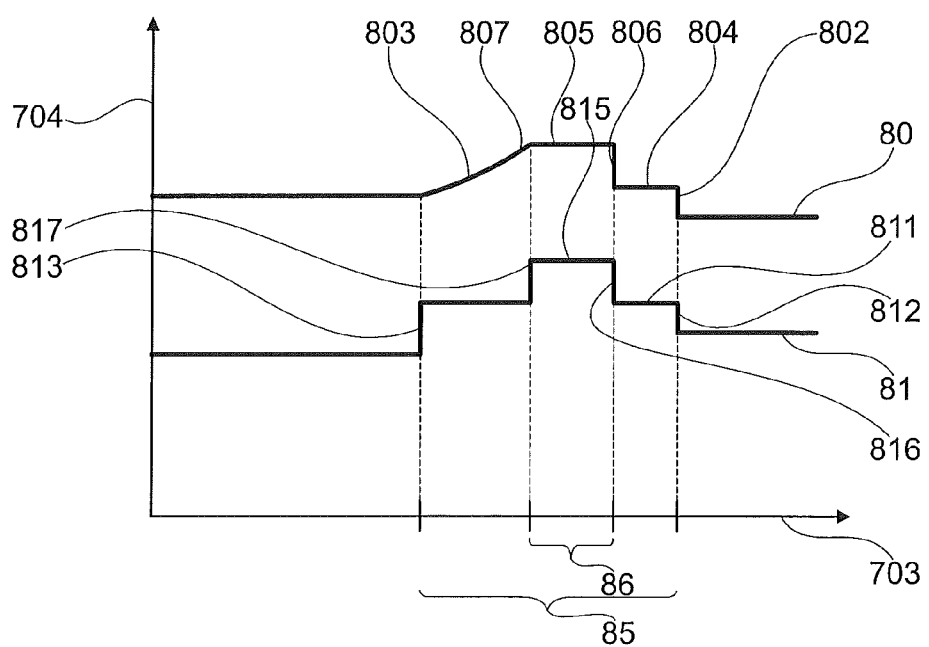
FIG. 3 shows a second illustration according to FIG. 2, wherein critical rotation-speed ranges do overlap.

FIG. 3 illustrates exemplarily two alternative schematic operation schedules 80, 81 for the starting system 40. Here, the key parameter may again be the rotation speed of the turbine rotor 12. Said rotation speed is plotted on an abscissa 703 in FIG. 3. Further, a first and a second critical rotation speed range 85, 86 are provided on abscissa 703 in an overlapping manner. Range 86 resides within range 85. On an ordinate 704 it is plotted, once again, the braking torque applied to the turbine rotor 12. Alternatively, the same FIG. 3 may be read with the ordinate providing the braking power delivered by the starting system 40 or the loading bearing on the starting system 40.

From FIG. 3 it becomes clear that the ordinate value (e.g. the braking torque or the loading imposed on the starting system 40) may also be varied within a critical rotation speed range, here critical rotation-speed range 85.

Figure 4:
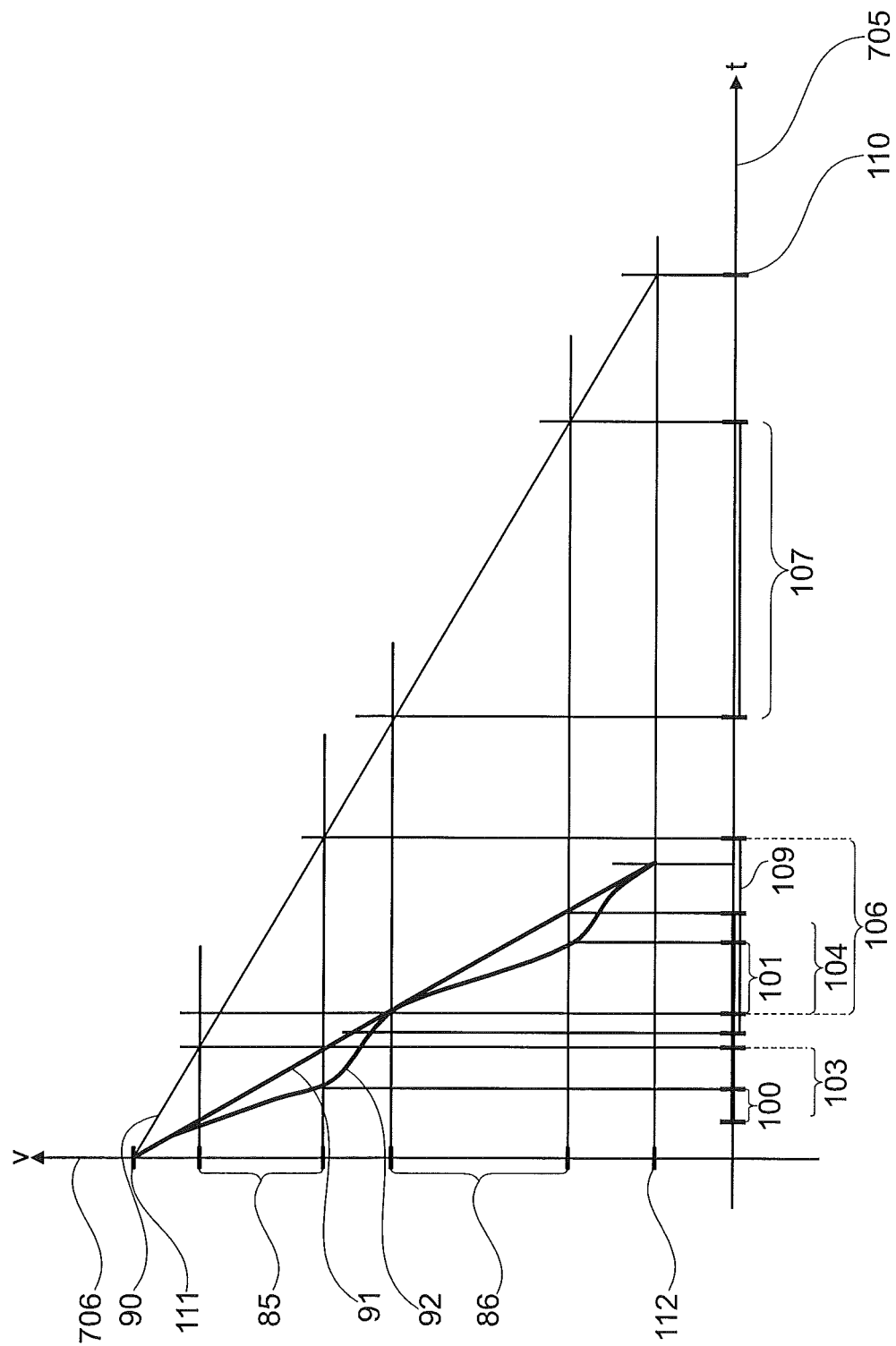
FIG. 4 shows a simplified schematic dependence of the rotation speed of a turbine rotor according to FIG. 1 on the deceleration time.

FIG. 4 shows, in a very simplified manner, the temporal evolution of the rotation speed while it changes from an initial rotation speed 111 to a lower final rotation speed 112. On an abscissa 705 is given the deceleration time after flame off and on an ordinate 706 the corresponding rotation speed of the turbine rotor 12. In the speed range, on the ordinate 706, there are given the two critical rotation-speed ranges 85, 86 in a non-overlapping manner. In ranges 85, 86 high vibrational loads may occur e.g. due to resonance phenomena as described above. Three deceleration curves 90, 91, 92 are depicted in FIG. 4.

For the sake of simplicity it is assumed that the freely spinning turbine rotor 12 may decelerate essentially linearly due to previously mentioned effects (and without any active braking). This is illustrated by the curve 90 in FIG. 4. It takes the turbine rotor 12 a deceleration time 110 to decelerate from initial speed 111 (e.g. 3000 rpm) down to final speed 112 (e.g. zero speed or higher). During this shut-down the turbine engine 1 accumulates, simply speaking, high vibrational loads mainly during time intervals 106 and 107 given on the abscissa 705. The intervals 106 and 107 are the time periods during which the rotor 12 decelerates through ranges 85 and 86, respectively.

If generative braking according to a preferred embodiment of the present invention is used, the deceleration rate is increased as compared to the situation given by the curve 90. Also the generative braking deceleration is simplified to follow the essentially linear curve 91 in the plot according to FIG. 4. Following curve 91, it takes the rotor 12 a time 109 to decelerate from initial speed 111 down to final speed 112. The absolute value of the average slope of curve 91 is higher than the one of curve 90, i.e. the deceleration rate higher. In FIG. 4 the time 109 is a third from the time 110 (in correspondence to the example described above). The turbine engine 1 accumulates high vibrational loads again mainly during rotation in the ranges 85 and 86, i.e. during corresponding time intervals 103 and 104. It is apparent from FIG. 4 that a sum of time the intervals 103 and 104 relating to curve 91 is significantly smaller than a sum of the time intervals 106 and 107 relating to curve 90, hence the vibrational loading on the engine 1 (or on parts connected thereto) is reduced upon change from run-down schedule 90 to schedule 91.

In a further embodiment of the present invention, the generative braking is increased in the critical rotation-speed ranges 85, 86, as described above, so as to have the starting device 40 operating at peak loading in these ranges 85, 86. After a typical period, that may here, again for simplicity, be equal the respective critical rotation-speed range, the starting system 40 must relax so as to not take damage, whereupon the deceleration rate drops (corresponding slope is decreased; it may be even smaller than the average slope of curve 91) as illustrated by the curve 92 in FIG. 4. Consequently, the time during which the turbine rotor 12 dwells in critical rotation-speed ranges 85, 86 amounts to the sum of corresponding time periods 100 and 101 (see FIG. 4). Following curve 92, it takes the rotor 12 a time 109 to decelerate from initial speed 111 down to final speed 112.

To summarize, the overall deceleration time 109 is the same for curves 91, 92 and shorter than the overall deceleration time 110 for curve 90. The vibrational loading in total is, however, reduced for a procedure according to curve 92 in comparison to curve 91 (and 90), as the sum of time intervals 100 and 101 relating to curve 92 is again significantly smaller than a sum of the time intervals 103 and 104 relating to curve 91.

The present invention thus may shorten significantly the shut-down process of a turbine engine 1 after flame as it causes the turbine rotor to decelerate faster. Furthermore, it reduces the vibrational loading on the turbine engine 1 or elements attached to the turbine engine 1.

The invention claimed is:

1. A method of decelerating a turbine rotor of a turbine engine, wherein at least one electric motor is engaged with the turbine rotor, wherein a braking system is engaged with the at least one electric motor so as to use the at least one electric motor to apply a negative torque on the turbine rotor; the method, comprising:
after flame off, dissipating kinetic energy available in the turbine engine after the flame off by using the at least one electric motor to apply the negative torque on the turbine rotor; and
varying the negative torque on the turbine rotor.

2. The method according to claim 1, wherein the electric motor is an electric generator, the electric generator provided for supplying a grid with power during normal operation of the turbine engine, the method comprising:
using the braking system for transforming the kinetic energy into electric energy by the electric generator.

3. The method according to claim 1, wherein the braking system is provided by a starting system for run-up of the turbine rotor to firing speed.

4. The method according to claim 1, comprising:
varying the negative torque applied on the turbine rotor during the deceleration of the turbine rotor in dependence of at least one key parameter selected from the group consisting of: rotation speed of the turbine rotor, vibrational loading on elements or groups of elements connected to or including the turbine engine, condition of the braking system, in particular its temperature, or a condition of the electric motor.

5. The method according to claim 4, comprising:
using the rotation speed of the turbine rotor as said key parameter; wherein at least one critical rotation-speed range is provided within a total rotation speed range of the turbine rotor after flame off, in which at least one critical rotation-speed range vibrational loads occur due to excitation of resonance frequencies of the elements or groups of elements connected to or being part of the turbine engine; and
using the braking system to increase the negative torque to the turbine rotor applied from a first level to a second level if the rotation speed of the turbine rotor lies within the critical rotation-speed range.

6. The method according to claim 5, wherein two or more critical rotation-speed ranges are provided in the total rotation speed range of the turbine rotor, the method comprising:
applying the negative torque to the turbine rotor at least temporarily during deceleration of the turbine rotor through the critical rotation-speed range, so that the braking system is used in peak-loading operation; and
applying the negative torque to the turbine rotor after said peak-loading operation and during deceleration through a rotation speed range that is not a critical rotation-speed range, at a loading below its peak loading.

7. The method according to claim 6, wherein the two or more critical rotation-speed ranges are not overlapping one another.

8. The method according to claim 6, wherein the two or more critical rotation-speed ranges are at least partly overlapping one another.

9. The method according to claim 2, comprising:
feeding the electric energy into the high-voltage grid while a generator output meets requirements of a high-voltage grid in-feed.

10. The method according to claim 2, comprising:
feeding the electric energy into a medium-voltage grid while a generator output meets requirements of a medium-voltage grid in-feed.

11. The method according to claim 2, comprising:
feeding the electric energy into an external load bank, into a battery element, and/or into at least one auxiliary power consumer of the turbine engine, so as to dissipate at least part of the electric energy; and
dissipating the electric energy by recharging the battery element and/or by at least partly covering an auxiliary power demand by the at least one auxiliary power consumer, respectively.

12. The method according to claim 11, wherein the at least one auxiliary power consumer of the turbine engine is selected from the group consisting of lube oil pumps, enclosure ventilation, cooling water pumps, due point heaters, trace heaters, and the like.

13. The method according to claim 1, wherein the turbine engine is a single shaft gas turbine engine and the kinetic energy stored in the rotating turbine shaft is dissipated.

14. Use of a method according to claim 1 during shut down of an industrial gas turbine engine or another turbine engine.

15. The method according to claim 1, wherein the turbine engine is a steam turbine and the kinetic energy stored in the rotating turbine shaft is dissipated.

* * * * *